April 11, 1967   H. E. SCHMITT   3,313,500
FLIGHT CONTROL MEANS FOR AIRCRAFT
Filed April 30, 1965   2 Sheets-Sheet 1

INVENTOR.
HEINZ E. SCHMITT
BY George Sullivan
Agent

April 11, 1967  H. E. SCHMITT  3,313,500
FLIGHT CONTROL MEANS FOR AIRCRAFT
Filed April 30, 1965                    2 Sheets-Sheet 2
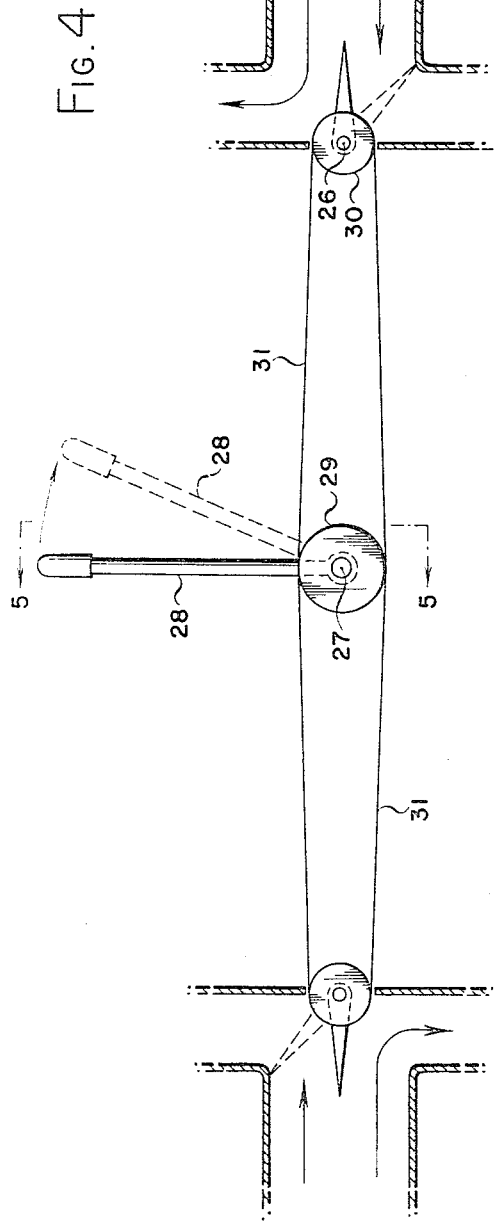
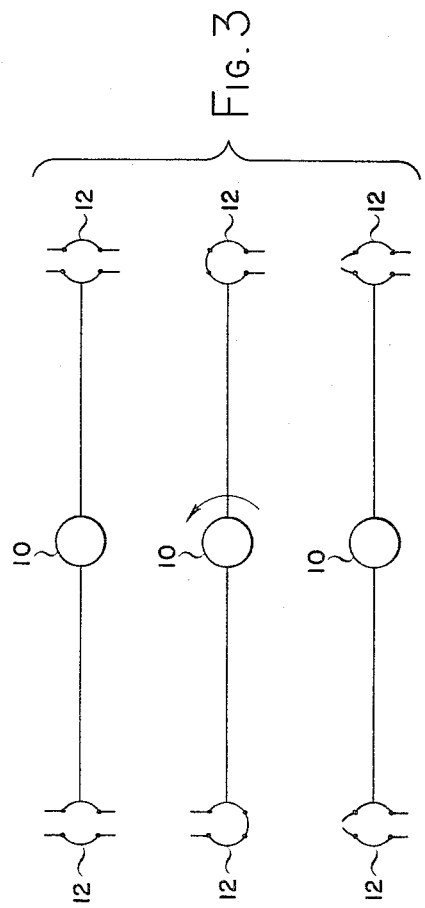
INVENTOR.
HEINZ E. SCHMITT
BY
Agent United States Patent Office 3,313,500
Patented Apr. 11, 1967

3,313,500
FLIGHT CONTROL MEANS FOR AIRCRAFT
Heinz E. Schmitt, Marietta, Ga., assignor to Lockheed Aircraft Corporation, Los Angeles, Calif.
Filed Apr. 30, 1965, Ser. No. 452,310
5 Claims. (Cl. 244—53)

This invention relates to flight control means for aircraft and more particularly to such means predicated on controlled variations in the thrust developed by propulsion units to facilitate attitude, lateral movement and stability of fixed wing aircraft especially during vertical, hovering or low-speed flight when dynamic pressure is insufficient for the proper and efficient operation of the conventional control surfaces.

Present day aircraft are required to take off and land on runways of minimum length and yet cruise at relatively high speed. While the conventional control surfaces (i.e., ailerons, elevators, rudders, etc.) are most efficient for normal horizontal or cruise flight, they have been recognized as inadequate controls for vertical, hover and low-speed flight and various supplemental devices have been employed to overcome this deficiency. The most common solution has been to provide downward and lateral thrust at the extremities of the aircraft with appropriate valving to produce an effective thrust direction whereby the forces thereof rotate the aircraft about its roll, pitch and yaw axes during the hover and low-speed flight regimes.

This is presently accomplished by bleed air and/or gases from the main engines ducted to outlets remote from the aircraft's center of gravity or by modulating the thrust of lift units located at a distance from the center of gravity by varying the engine speed (r.p.m. control). In either case, the effective lifting force is reduced and in larger aircraft the forces necessary for flight control become prohibitive. Thus, complex ducting has been devised to obtain the necessary moment arm between the thrust vector and the aircraft center of gravity. The same result has been obtained by complicated mechanisms to swing the lift units out and away from the aircraft's center of gravity.

The instant invention recognizes the many problems in the provision of an efficient flight control system, particularly for larger aircraft (above 60,000 pounds vertical take-off weight), as well as the shortcomings of the prior art solutions to these problems including those referred to above. It is therefore herein proposed to provide individual thrust generators strategically located on the aircraft with reference to its center of gravity and several axes of rotation to stabilize and control flight during the vertical, hover and low-speed regimes.

While the thrust generators which this invention has in view are borne by the aircraft a substantial portion of the total flight without any actual contribution thereto, their design and operation is such to impose a minimum penalty on the aircraft. Thus, the total performance and capability of the aircraft is appreciably enhanced and the net gain is substantial.

The invention is therefore directed to an aircraft control system operative to improve flight stability and effect instantaneous, amplified, and more certain flight maneuvers during the vertical, hover, and/or low-speed regimes. At the same time, this system incorporates means to minimize its burden in terms of drag, weight and fuel-consumption on the aircraft during periods of its inoperativeness or ineffective operation. This is accomplished by relatively uncomplicated means that is both efficient and reliable.

More specifically, the present invention contemplates a stability and control engine for aircraft that is adapted to be housed within the airframe or within an aerodynamic housing carried externally of the airframe which when normally operating ejects its exhaust laterally and symmetrically therefrom. Associated with this engine is exhaust diverting means operative to direct the exhaust asymmetrically and thereby produce an effective thrust of selected direction. By interconnecting the diverting means of coacting engines for a selected, coordinated sequential operation, flight control of the aircraft in the vertical, hover and low-speed flight regimes is accomplished.

With the stability and control engine or engines operating at full speed, instantaneous response now becomes possible. As opposed to prior systems requiring a transfer of thrust from remote lift engines or a change in the engine speed, mere adjustment of the diverting means is necessary virtually eliminating lag time. Additionally, because of the positive-negative thrust vectoring ability, fifty percent control about any axis is maintained with one of the control and stability engines on that axis disabled or otherwise inoperative. For the same reason lift augmentation by the control and stability engines is possible for example in an emergency as when one of the lift engines is inoperative without a complete loss of the control capability thereof.

The above and other objects and advantages of the invention will be apparent from the following detailed description of an illustrative embodiment thereof read in conjunction with the accompanying drawings wherein.

Figure 1:
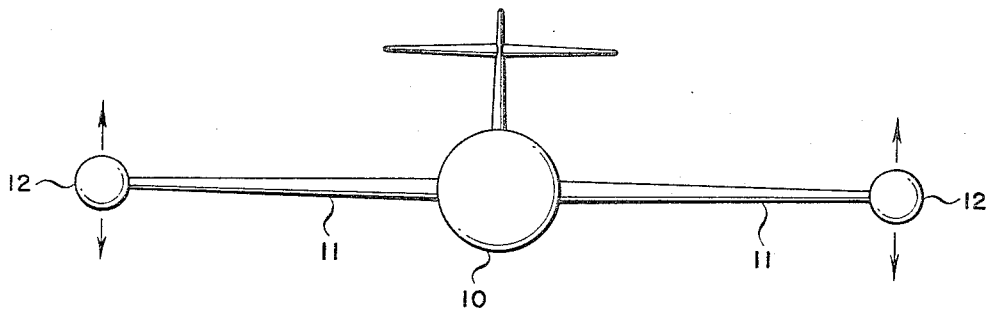
FIGURE 1 is a front elevation of an aircraft having a stability and control engine constructed, organized and arranged in accordance with the teachings hereof mounted on each wing tip.
Figure 2:
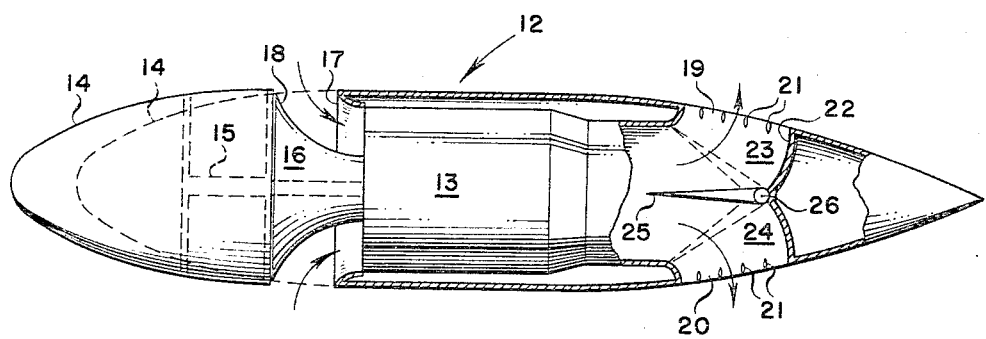
FIGURE 2 is a longitudinal section through one of the engines illustrated in FIGURE 1 to show primarily the exhaust outlets therein and the associated exhaust diverting means located in its neutral position whereby the exhaust mixture is discharged laterally and symmetrically therefrom, the other extreme positions of the exhaust diverting means being shown in phantom lines.

FIGURE 3 is a schematic view representing the three principal operating conditions of the coacting engines shown in FIGURES 1 and 2 disposed about the roll axis of the aircraft to show the neutral position thereof whereby the exhaust mixture is discharged laterally and symmetrically thereof, the exhaust mixture is discharged laterally and asymmetrically from each engine in a vertical direction diametrically opposed to that of the other engine to effect roll of the aircraft, and the exhaust mixture is discharged laterally and asymmetrically from each engine in the same general direction and equally to effect lift of the aircraft and still allow for roll control.

Figure 5:
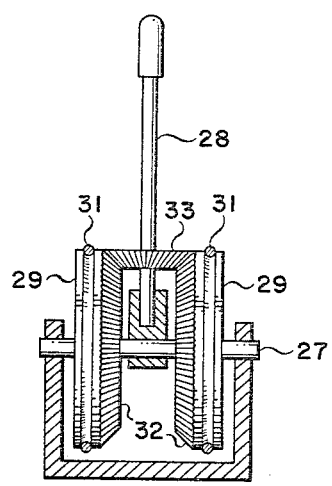

FIGURE 4 is a schematic view illustrative of interconnecting means between each pair of coacting engines and a pilot's remote control therefor whereby the several operations thereof including those shown in FIGURE 3 are accomplished; and FIGURE 5 is a section taken along line 5—5 of FIGURE 4.

Referring more particularly to the drawings, 10 designates the fuselage of an aircraft having laterally disposed fixed wings 11. At its outer end or tip, each wing 11 carries an aerodynamic pod 12 fixedly mounted thereon in any conventional manner. Each pod 12 houses a propulsion unit which may be a turbojet or turbofan engine 13. For all intents and purposes, the pods 12 and their engines 13 are identical and the following description is equally applicable to each such pod engine assembly.

At its forward end the engine 13 carries a linearly extendible and retractable, conical fore body 14 mounted axially thereof. In the retracted position shown in phantom lines, FIGURE 2, the fore body 14 overlies and encloses the inlet opening to the engine 13 forming a smooth and aerodynamic continuation of the external surface of the pod 12 and constituting the nose thereof. The fore body or nose cone 14 is mounted on and connected to the axial center of the engine 13 for relative reciprocation by suitable power means which may be a conventional screw jack 15 or the equivalent. Adjacent its aft end the nose 14 is tapered centrally producing a symmetrical, arcuate surface 16 which when the nose 14 is extended coacts with an associated lip 17 projecting from the peripheral edge of the engine 13 to form an annular inlet duct 18.

Adjacent its aft end the pod 12 is provided with a pair of diametrically disposed openings 19 and 20 in the side walls thereof adjacent the exhaust outlet from the engine 13. For reasons to become more apparent each of these openings 19 and 20 is preferably rectangular. Mounted in each of the openings 19 and 20 is a series of vanes or louvers 21 disposed substantially at right angles to the longitudinal center line of the engine 13. If desired these louvers may be adjustable in a conventional manner through standard linkage to various angular positions including a position where they align one with the other to completely close the associated opening 19 or 20.

Internally the pod 12 is formed or otherwise provided with a transverse wall 22 disposed in alignment with the edge of the pod 12 defining the rear side of the openings 19 and 20. A pair of laterally disposed exhaust ducts 23 and 24 from the engine outlet is thereby produced in the pod 12. A deflector plate 25 is mounted at the center of the wall 22 to project therefrom in a forward direction and being rotatable about a hinge line 26. The plate 25 has a shape and area corresponding to the transverse dimension of each exhaust duct 23 and 24 whereby it overlies and closes one of said ducts when fully rotated in either direction from the longitudinal center line of the pod 12.

Any conventional linkage or mechanism may be employed for the rotation of the plate 25 with the normal position thereof being along the longitudinal center line of the engine whereby the exhaust mixture therefrom is divided and directed through the openings 19 and 20. To facilitate this the plate 25 is preferably triangular in section with the apex thereof upstream, i.e. toward the engine 13.

Preferably, the control linkage for actuation of the plates 25 associated with each pair of coacting engine pods 12 is integrated with the existing conventional control system of the aircraft 10 that is effective during normal cruise flight. FIGURES 4 and 5 show by way of example how this may be accomplished. The pivot 27 on which the standard, pilot's control stick 28 is mounted for rotation to effect roll of the aircraft 10 through movement of the ailerons is modified to include a pair of pulleys 29 rotatably mounted thereon, one on either side of the stick 28. Each of these pulleys 29 is interconnected with a coacting pulley 30 keyed to the hinge 26 or otherwise connected to each plate 25 of the coacting engine pods 12 on the wings 11 for unitary movement therewith through a cable 31. Both cables 31 are maintained taut at all times through conventional means customarily used for the purpose so that the pulleys 29 and 30 thus connected rotate in unison when the stick 28 is rotated on its pivot 27. This drives the plates 25 associated with the opposite engine pods 12 equally and in opposite directions corresponding to the operation illustrated in the second condition of FIGURE 3.

On their adjacent sides the pulleys 29 carry bevel gears 32 adapted to mesh with a similar drive gear 33 carried by the stick 28. In the rotation of the stick 28 as above described, this engagement of the gears 32 and 33 serves to lock the stick 28 to both pulleys 29 which are thereby rotated in the same direction on the pivot 27. When, however, the stick 28 is rotated about its own longitudinal center line, the gears 32 are rotated in opposite directions through this gear engagement. This effects a movement of the plates 25 associated with the opposite engine pods 12 equally and in the same direction corresponding to the operation illustrated in the third condition of FIGURE 3.

In view of the foregoing construction and arrangement when the nose 14 is extended and the engine 13 is operating, the exhaust mixture therefrom is normally discharged symmetrically from the pod 12 through the openings 19 and 20 therein. This corresponds to the operation illustrated in the first condition of FIGURE 3. The thrust produced thereby is thus spoiled; however, fuel consumption at this time is held to a minimum due to the aggregate exhaust outlet area provided by the openings 19 and 20. Upon actuation of the plates 25 to a position on either side of the longitudinal center line of their pods 12, as above described, an unbalanced exhaust condition results. Where such actuation is effected by rotation of the stick 28 about its pivot 27, i.e. the plates 25 move in equal and opposite directions, this produces a rotation of the aircraft 10 about its roll axis, viz. roll control. Where on the other hand such actuation is effected by rotation of the stick 28 about its own longitudinal center line, i.e. the plates move equally in the same direction, this produces a vertical force on the aircraft, viz. attitude control.

It is to be understood that for purposes of illustration and an understanding of the invention, the flight control means herein proposed has been described specifically and as applied in relation to the roll axis of the aircraft. It is equally applicable to the pitch and yaw axes. Moreover, numerous modifications or alterations to the preferred embodiment hereinabove disclosed will be obvious to those skilled in the art without departing from the spirit and scope of the invention which is to be limited solely by the appended claims.

What is claimed is:

1. In an aircraft having a main engine for its powered flight, at least one auxiliary engine constituting directional control means during such flight comprising:
    a thrust generator mounted in a selected position with respect to an axis of rotation of the aircraft;
    a bifurcated duct from said generator established by a stationary, transverse end wall and adjacent laterally and symmetrically disposed ducts terminating in exhaust outlets for the flow of exhaust mixture produced by said generator therethrough;
    a deflector disposed in the longitudinal center of said bifurcated duct extending at all times in an upstream direction with its opposite sides coacting with the adjacent surface of said transverse wall to define said bifurcated duct and equally divide said exhaust mixture for passage through said outlets; and
    actuating means adapted to move said deflector toward so as to partially close one of said outlets without affecting the transverse dimension of the other of said outlets and thereby produce an unequal distribution of the exhaust mixture through the outlets and an imbalanced thrust condition on said aircraft.

2. The directional control means of claim 1 wherein multiple auxiliary engines are employed and including linkage adapted to interconnect the actuating means of the respective generators of said auxiliary engines for the movement of the associated deflectors thereof in unison equally in both the same and in opposite directions.

3. The directional control means of claim 1 including a plurality of vanes disposed in each of said outlets at substantially right angles to the longitudinal centerline of the aircraft when said thrust generator is operating.

4. The directional control means of claim 1 wherein each said auxiliary engine is mounted within a pod adapted to be carried externally of the aircraft, said pod including movable fairing means enclosing said auxiliary engine when inoperative to render the pod aerodynamically clean.

5. The directional control means of claim 2 including a connection between said linkage and a pilot operated control.

References Cited by the Examiner
UNITED STATES PATENTS

| | | | |
|---|---|---|---|
| 2,451,008 | 10/1948 | Williams | 244—52 |
| 2,518,697 | 8/1950 | Lee | 239—265.25 |
| 2,857,119 | 10/1958 | Morguloff | 244—52 |
| 2,921,435 | 1/1960 | Landgraf | 60—35.55 |
| 3,047,254 | 7/1962 | Spearman et al. | 244—52 |
| 3,060,685 | 10/1962 | Tonnies et al. | 244—55 X |
| 3,172,623 | 3/1965 | Ward | 244—55 |

MILTON BUCHLER, *Primary Examiner.*

LARRY C. HALL, FEGUS S. MIDDLETON, B. BELKIN, *Assistant Examiners.*